Figure 1:
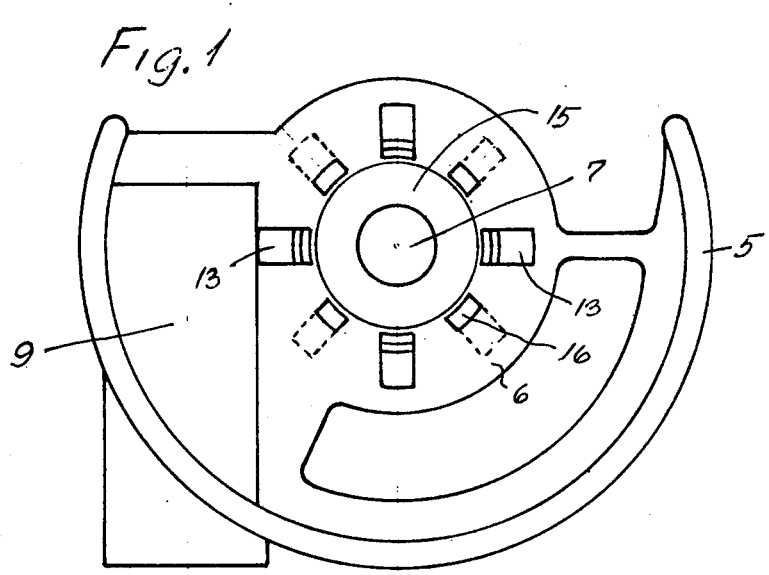

United States Patent [19]

Harlang

[11] 4,024,601
[45] May 24, 1977

[54] HOUSING FOR CASTORS HAVING TWIN ROLLERS

[75] Inventor: Bent Harlang, Klampenborg, Denmark

[73] Assignee: Kevi A/S, Glostrup, Denmark

[22] Filed: Feb. 4, 1976

[21] Appl. No.: 655,295

[30] Foreign Application Priority Data

Feb. 19, 1975 Denmark .............................. 614/75

[52] U.S. Cl. .................................... 16/31 R; 16/47
[51] Int. Cl.² ............................................. B60B 33/00
[58] Field of Search ...................... 16/47, 48, 31 R

[56] References Cited

UNITED STATES PATENTS

| | | | |
|---|---|---|---|
| 2,539,108 | 1/1951 | Shepherd | 16/45 X |
| 3,040,370 | 6/1962 | Ford | 16/47 |

*Primary Examiner*—Werner H. Schroeder
*Assistant Examiner*—Conrad L. Berman
*Attorney, Agent, or Firm*—Lawrence Rosen; E. Janet Berry

[57] ABSTRACT

A housing for twin roller castors is described having a cover for the rollers in one piece with a central partition, the latter having hooks on each side disposed circularly around a through-going, rigidly mounted spindle for the rollers for retaining the rollers by engaging a groove on the cylindrical surface of the roller hub, when the roller is mounted upon the spindle.

3 Claims, 3 Drawing Figures

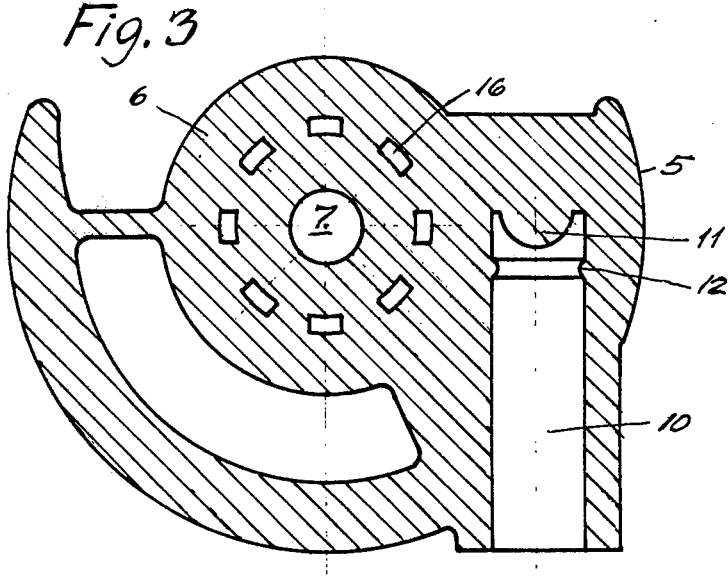

HOUSING FOR CASTORS HAVING TWIN ROLLERS

This invention relates to a housing for castors having twin rollers and being designed with a cover for the rollers, said housing being of the kind, where the cover is in one piece with a central partition in the housing, a rigidly mounted spindle or axle for the rollers passing through said partition, the partition also having a bore for a spigot in the central plane of the housing in staggered relationship to the spindle.

In known castors of the said kind, the object has been to obtain an easy assembling and removing of individual parts of the castor, said object being obtained by retaining the rollers on the axle of the assembled castor by means of a specially designed locking plate.

The present invention is based upon the concept that in many cases there is no need of being able to separate the castor into parts once it is in use, and that it should thus be possible to further reduce the number of parts and to simplify the assembling of the castors.

With this object in view, the housing of a castor of the said kind, having a cover, is characterized in having, on each side of the central partition, two or several projecting, to a certain degree elastic retaining hooks, spaced along a circle, and being designed as projections having inward turned lugs at their outer ends, the said lugs being at a distance from the partition corresponding to the distance to a circumferential groove in the hub of a roller being mounted upon the axle as closely as possible to the central partition of the housing, or to a stop on said partition, without actually coming into contact with said partition or stop.

Thus, manufacturing and mounting of a special locking plate is made unnecessary, and the assembling of the castor becomes extremely simple, comprising only mounting the rollers upon the axle and exerting a slight pressure, whereby the hooks are bent slightly backwards until their lugs slip into the cirmumferential groove of the roller hub.

In an appropriate embodiment of the present cover housing, according to the invention, there are provided openings or perforations circularly disposed around the through-going axle centrally mounted in the partition, said openings or perforations being flush with the inner side of the hooks and being of a size of at least equal to the cross-section of the lugs of the hooks.

This further simplifies the manufacturing, since the said openings make it possible to cast the cover and the partition with its hooks in a single process, using a mould consisting of two halves with projections for filling out the spaces below the lugs of the hooks.

An embodiment of the cover housing according to the invention is shown in the accompanying drawing, in which FIG. 1 is a side elevation of the housing,
FIG. 2 the housing seen from below, and
FIG. 3 is a sectional view along the line A—A in FIG. 2.

The housing as shown has been cast in one piece, preferably from a hard, but to some extent elastic plastic, e.g. nylon. It consists of a cover 5 and a partition 6 with a central opening 7 for the rigid mounting of an axle 8.

In staggered relationship to the axle opening 7, the partition 6 has a thicker part 9 with a cylindrical bore 10 for the mounting of a spigot (not shown) for the castor. At its bottom, the bore 10 in known manner has a stop 11 for the spigot, said stop being designed as a hemisphere. Near said stop, a shoulder 12 is provided for meshing with a corresponding groove in the axle.

On each side of the partition 6, four hooks 13 are projecting. They are shaped as projections having lugs 14 turned towards the axle opening 7 and being at some distance from annular stops 15 in one piece with the partition, and surrounding the spindle opening 7.

Figure 2:
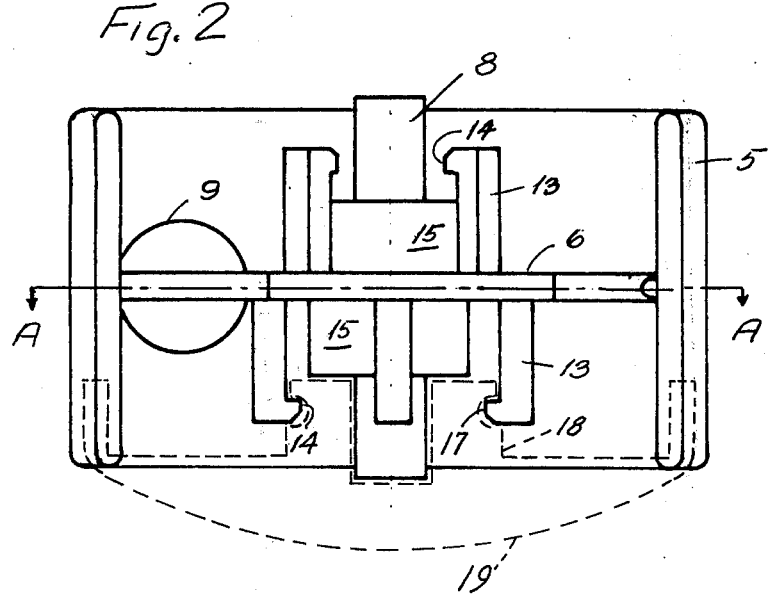

As shown in FIG. 2, lugs 14 fit in grooves 17 of the cylindrical surface of the inwardly projecting hub 18 of roller 19 (shown in phantom).

As shown, the hooks 13 on one side of the partition 6 are placed in the spaces in between the hooks on the other side of the partition.

Openings 16 in the partition 6 and disposed immediately below the lugs of the hooks are provided for technical reasons of casting, making possible a simplified design of the moulds serving for casting of the cover housing.

What is claimed is:

1. A housing for castors having twin rollers, said twin rollers being of the type having a groove in the cylindrical surface of its inwardly projecting hub, said housing comprising:
   a. a unitary roller cover having a central partition;
   b. a first axle rigidly mounted on said partition and extending from a first side of said partition, said first axle adapted to support one of said twin rollers;
   c. a second axle rigidly mounted on said partition and extending from a second side of said partition, said second axle adapted to support the other of said twin rollers;
   d. a bore in said partition spaced from said first and second axles and adapted to receive a spigot for said castor;
   e. a first and second slightly elastic hooks extending from said first side of said partition, said first and second hooks being located along an arc of a circle which is concentric with said first axle;
   f. third and fourth slightly elastic hooks extending from said second side of said partition, said third and fourth hooks being located along an arc of a circle which is concentric with said second axle;
   g. said first and second hooks each having a radially inward projecting lug adapted to engage said groove in said one of said twin rollers to retain said one of said twin rollers on said first spindle;
   h. said third and fourth hooks each having a radially inwardly projecting lug adapted to engage said groove in said other of said twin rollers to retain said other of twin rollers on said second spindle.

2. A housing according to claim 1, in which openings or perforations are provided in the central partition flush with the inner side of the hooks, said openings or perforations being at least of a size corresponding to the largest cross-section of a hook with its lug.

3. A housing according to claim 1 wherein said first and second axles are opposite ends of a single axle extending through said central partition.